(12) United States Patent
Woods et al.

(10) Patent No.: US 7,905,460 B2
(45) Date of Patent: Mar. 15, 2011

(54) HUBS FOR WALL MOUNTING SYSTEMS

(75) Inventors: Alan Woods, Middlesex (GB); David Lees, Bucks (GB)

(73) Assignee: Path Products Limited, Reading (GB)

( * ) Notice: Subject to any disclaimer, the term of this patent is extended or adjusted under 35 U.S.C. 154(b) by 39 days.

(21) Appl. No.: 12/140,464

(22) Filed: Jun. 17, 2008

(65) Prior Publication Data

US 2008/0315052 A1    Dec. 25, 2008

(30) Foreign Application Priority Data

Jun. 22, 2007  (GB) .................................. 0712264.1

(51) Int. Cl.
*E04G 3/00* (2006.01)
(52) U.S. Cl. .................. 248/284.1; 248/274.1; 248/371; 248/225.11; 248/225.21; 248/231.91; 248/220.21; 248/276.1; 248/917; 248/918; 248/919; 248/920; 248/921; 248/922; 248/923; 248/292.11; 248/924; 361/679.02; 361/679.04; 361/679.06; 361/679.21
(58) Field of Classification Search .......... 248/917–924, 248/284.1, 274.1, 371, 225.11, 225.21, 231.91, 248/220.21, 276.1; 361/679.02, 679.04, 361/679.06, 679.21
See application file for complete search history.

(56) References Cited

U.S. PATENT DOCUMENTS

| | | | |
|---|---|---|---|
| 6,186,460 B1 * | 2/2001 | Lin ............................ | 248/284.1 |
| 6,427,288 B1 * | 8/2002 | Saito ............................. | 16/361 |
| 6,478,275 B1 * | 11/2002 | Huang ........................ | 248/284.1 |
| 6,554,242 B2 * | 4/2003 | Kim ............................... | 248/371 |
| 6,766,994 B2 * | 7/2004 | Serbinski et al. ............. | 248/371 |
| 6,905,101 B1 | 6/2005 | Dittmer ......................... | 248/274 |
| 6,929,228 B2 * | 8/2005 | Whitaker et al. .......... | 248/284.1 |

(Continued)

FOREIGN PATENT DOCUMENTS

EP    1 496 776    11/2003

(Continued)

OTHER PUBLICATIONS

Search Report from corresponding Great Britain application Serial No. GB0712264.1, dated Oct. 19, 2007.
Search Report from corresponding European application Serial No. 08251938, dated Nov. 11, 2009.

*Primary Examiner* — Anita M King
*Assistant Examiner* — Nkeisha J Smith
(74) *Attorney, Agent, or Firm* — Westman, Champlin & Kelly, P.A.

(57) ABSTRACT

Improvements are provided for hubs for wall mounting systems for screens, and in particular to a hub for a wall mounting system for a flat panel screen, such as a plasma display or television screen, which enables the screen to be tilted. The hub comprises a casing, means for attaching the hub to a screen bracket, means for attaching the hub to an arm of a wall mount, and a tilt member. The tilt member has a sliding member which is located within an arcuate cavity in the casing such that the sliding member and casing are slidable relative to each other to enable a screen attached to the mounting system to be tilted about a horizontal pivot axis. The arc is defined by the cavity having its centre, which forms the pivot axis; offset from the centre of gravity of the screen. The hub further comprises a compression spring located within the casing and biased to provide a counterbalancing force so that the screen remains stationery in any position.

7 Claims, 3 Drawing Sheets

U.S. PATENT DOCUMENTS

| | | | |
|---|---|---|---|
| 7,159,828 B1 * | 1/2007 | Yau et al. | 248/125.8 |
| 7,513,473 B2 * | 4/2009 | Lu et al. | 248/276.1 |
| 7,513,474 B2 * | 4/2009 | Anderson et al. | 248/284.1 |
| 7,562,851 B2 * | 7/2009 | Hein et al. | 248/281.11 |
| 2004/0079858 A1 * | 4/2004 | Rudolf | 248/919 |
| 2005/0061937 A1 * | 3/2005 | Kim | 248/274.1 |
| 2007/0041150 A1 * | 2/2007 | Short et al. | 361/681 |
| 2009/0230271 A1 * | 9/2009 | Grabania et al. | 248/299.1 |

FOREIGN PATENT DOCUMENTS

| | | |
|---|---|---|
| EP | 1 471 300 A2 | 3/2004 |
| EP | 1 618 329 | 7/2004 |
| WO | WO 03/092341 | 11/2003 |
| WO | WO 2004/063619 | 7/2004 |
| WO | WO 2007/032781 | 3/2007 |
| WO | WO 2008/014705 | 2/2008 |

* cited by examiner

HUBS FOR WALL MOUNTING SYSTEMS

The present application is claims priority of Great Britain patent application Serial No. 0712264.1, filed Jun. 22, 2007, the content of which is hereby incorporated by reference in its entirety.

BACKGROUND OF THE INVENTION

The invention relates to improvements in hubs for wall mounting systems for screens, and in particular to a hub for a wall mounting system for a flat panel screen, such as a plasma display or television screen, which enables the screen to be tilted.

As a result of the use of plasma and LCD technology, many modern display screens and televisions are now significantly flatter than previously. This means that there is considerably more flexibility for mounting and installing them. It is particularly advantageous that these flatter screens can be wall mounted, either for home or business use, as this does not use up valuable floor or surface space. Although flat wall mounting systems have been the most common mounting option for such screens, tiltable wall mounting systems are preferable as this enables the screen to be placed higher than the desired eye level. Thus the screen can be located above shelves or a fire place and the need for a ceiling mount is avoided, which have hitherto been commonly used with commercial display screens.

As screens become heavier and larger, this creates complexities in the design and the components of the wall mounting system and in particular the mechanisms which enable the screen to be tilted. One such mechanism is the hub, which connects the screen bracket(s) to the wall mount.

Tilt adjustment in a number of prior art hubs is provided by a mechanical friction lock which allows an axle to freely move in a predetermined slider. After adjustment, the hub is locked by turning a threaded bar. The disadvantage of these devices is that the screens are generally heavy and awkward to handle and the full weight of the screen must be supported when the hub is unlocked.

In another prior art tiltable wall mount described in WO 2004/063619, the hub comprises an arcuate sliding connection between the screen mount and the wall mount enables the screen to be pivoted about a virtual pivot axis which passes through the centre of gravity of the display. This device has no clamping or other locking device to maintain the tilt position as the weight of the screen is balanced in any on of the angular positions.

SUMMARY OF THE INVENTION

It is an object of the present invention to provide an improved hub which makes it easy to adjust the tilt angle of the screen.

BRIEF DESCRIPTION OF THE DRAWINGS

A preferred embodiment of the present invention will now be described, by way of example only, with reference to the accompanying drawings in which.

DETAILED DESCRIPTION OF ILLUSTRATIVE EMBODIMENTS

Figure 1:
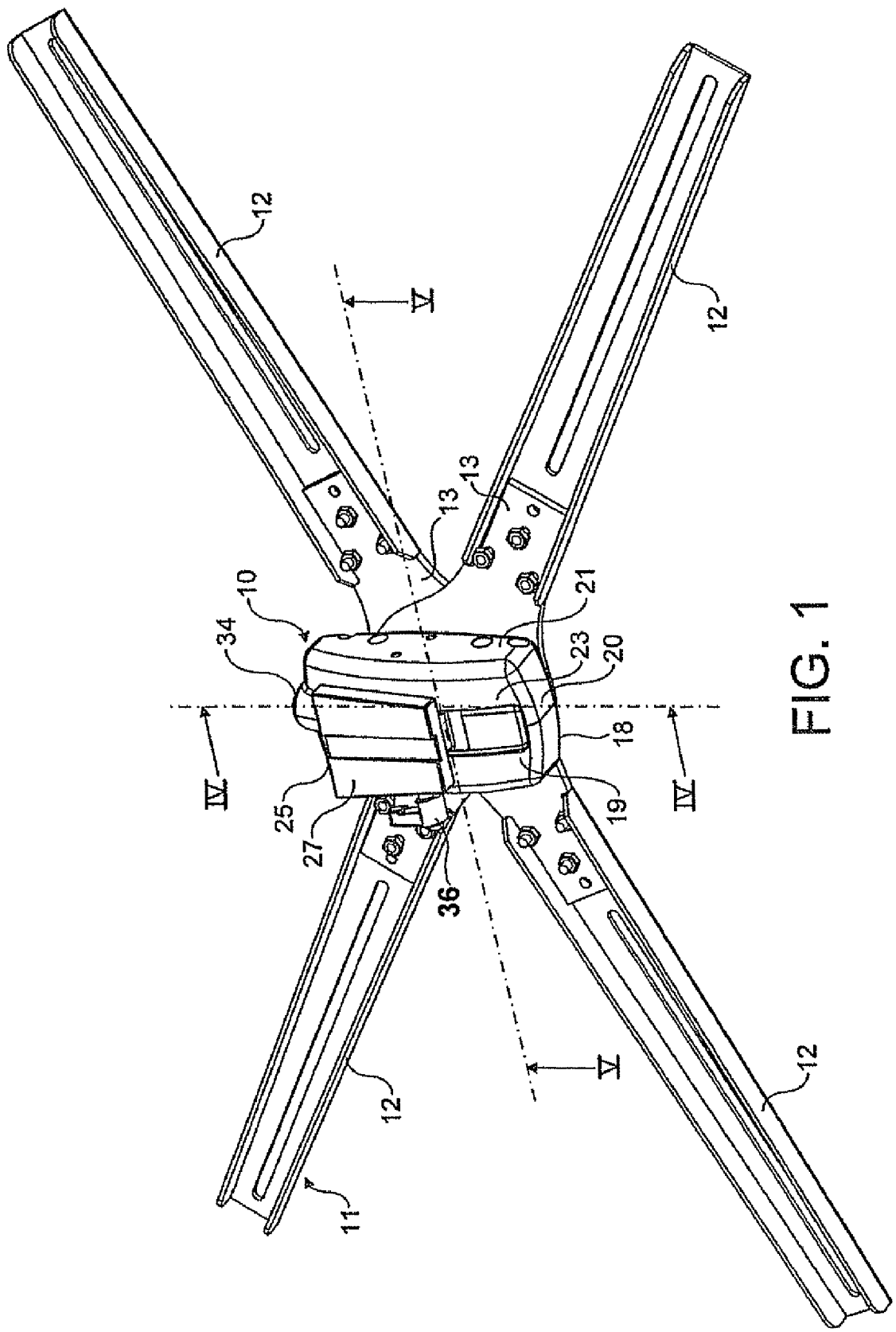
FIG. 1 is a perspective view of the hub of the present invention attached to screen brackets.
Figure 2:
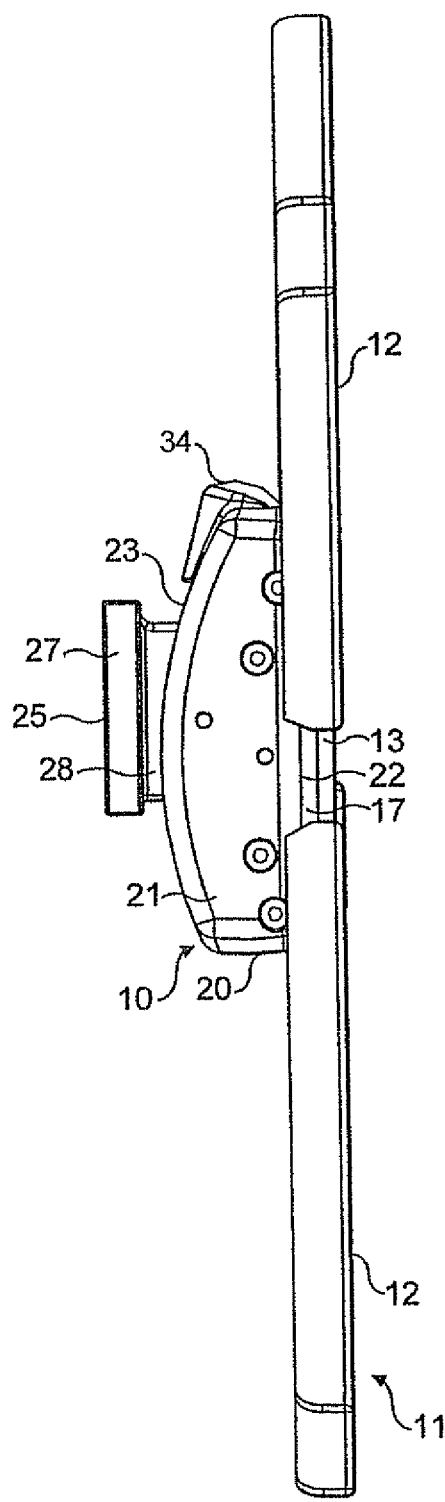
FIG. 2 is a side elevation of the hub of FIG. 1.
Figure 3:
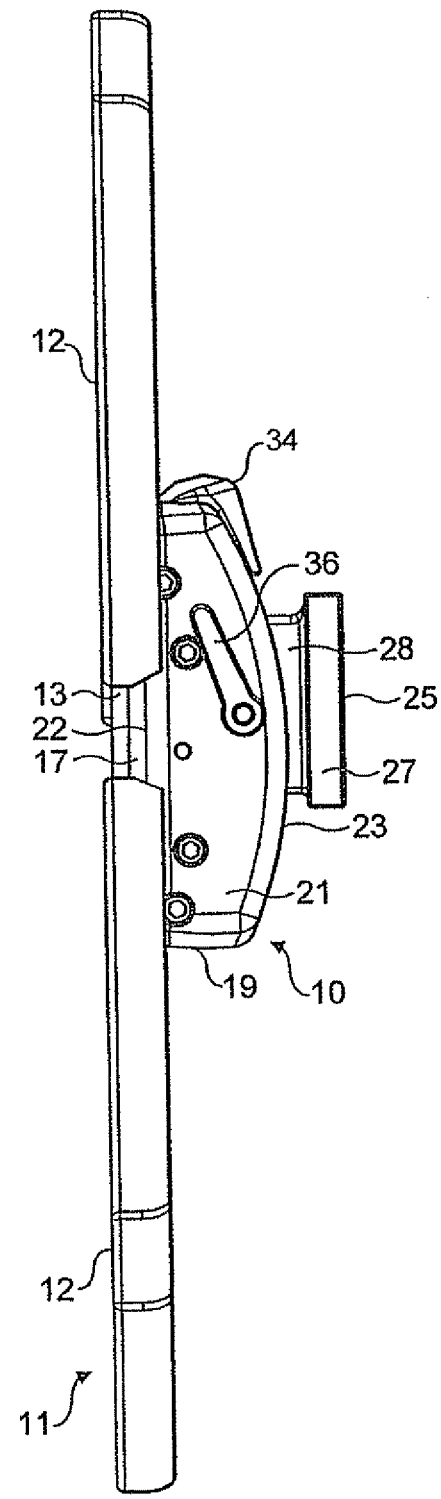
FIG. 3 is the opposite side elevation to that of FIG. 2.
Figure 4:
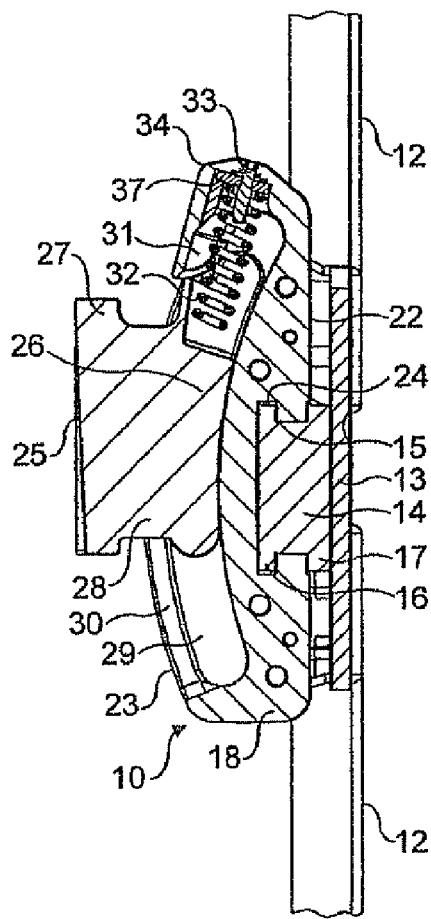
FIG. 4 is a sectional side elevation on the line IV-IV of FIG. 1.

FIG. 1 shows a hub 10 for a wall mounting system attached by suitable fixings, such as bolts, to a screen bracket 11 for a screen. The bracket 11 illustrated is an X-shaped bracket consisted of a four arms 12 attached to a central plate 13. The bracket can, however, be of other designs.

Figure 5:
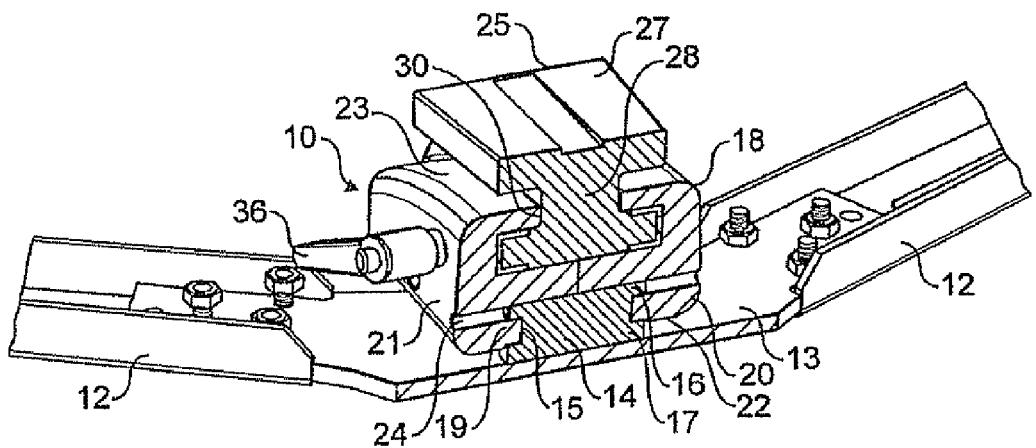
FIG. 5 is sectional end elevation on the line V-V of FIG. 1.

The hub 10 has a casing 18 formed by two sections 19, 20 (see FIG. 5) bolted together through the sides 21 of the casing sections 19, 20. The hub 10 has a front face 22 and a rear face 23.

Projecting through the casing 18 from the front face 23 of the hub 10 is a support member 14 which provides the means for attaching the hub 10 to the central plate 13 of the bracket 11. The support member 14 is preferably cylindrical, having flat end surfaces. One end surface is provided with means for attaching it to the central plate, such as threaded holes to receive a plurality of bolts. A groove 15 is formed in its peripheral wall, leaving flanges 16,17 on either side of the groove 15. The casing sections 19, 20 have first recesses so that when they are bolted together the first recesses from the two sections 19,20 define a first cavity 24 which is shaped to receive and secure the grooved section and inner flange 16 of the support member 14.

Projecting through the casing from the front face 22 of the hub 10 is the tilt member 25. The tilt member 25 is a flanged member having an inner flange 26, which forms a sliding member, and an outer flange 27 joined by a central section 28. The casing sections 19, 20 are provided with second recesses so that when they are bolted together the second recesses from the two sections 19,20 define an arcuate cavity 29 which is shaped to receive the inner flange 26 of the tilt member 25 and to allow it to slide within the cavity 29. The cavity 29 defines the range of sliding motion of the screen and the arc defined by the cavity 29 is a portion of a circle having its centre (which is the pivot axis) within the hub 10. Thus the pivot axis is offset from the centre of gravity of the screen, and this creates a moment of force.

On the underside of the casing 18 is a nodule 30, which defines a bore 31, which merges at its upper end with the arcuate cavity 29. Located on a spigot 33 projecting up into the bore 31 is a compression spring 32. The lower surface of the tilt member 25 also contains a bore 34, which receives the upper end of the spring 32. The spring 32 provides a counterbalancing force.

A locking arm 36 extends from one side 21 of the casing 18. Rotation of the arm 36 in one direction locks the relative positions of the casing 18 and the tilt member 25; rotation of the arm 32 in the other direction releases the tilt member 24 so that it is able to slide within the arcuate cavity 29.

The outer flange 27 is shaped to slot into a recess in a holder attached to the wall mount (not shown).

In use, the central plate 13 of the screen bracket 11 is attached to the support member 14 and the screen bracket 11 attached to a screen. The outer flange 27 of the tilt member 25 is placed in the holder of a wall mount attached to a wall, and the screen is thus mounted on the wall. To adjust the tilt position of the screen, the locking arm 31 is released and the screen moved to the desired angle as the casing 18 rotates about the tilt member 25. The counterbalancing force of the spring 32 supports the weigh of the screen by cancelling the moment force resulting from the offset pivot point to maintain the natural balance of the screen, so that it remains stationery in the position it is moved to. The locking arm 31 is not necessary to maintain the screen position, but serves to prevent accidental alteration of the screen position.

The invention claimed is:

1. A hub for a wall mounting system for a screen comprising a casing, means for attaching the hub to a screen bracket, means for attaching the hub to an arm of a wall mount, and a tilt member having a sliding member which is located within an arcuate cavity in the casing such that the sliding member and casing are slidable relative to each other to enable a screen attached to the mounting system to be tilted about a horizontal pivot axis, the arcuate cavity defining an arc having its centre, which forms the pivot axis, and which in use is adapted to be offset from a centre of gravity of the screen, the hub further comprising a compression spring located within the casing and biased to provide a counterbalancing force so that the screen remains stationery in any position, and wherein the means for attaching the hub to an arm of a wall mount comprises a flange of the tilt member.

2. A hub as claimed in claim 1 further comprising a locking device for locking the sliding member relative to the casing.

3. A hub as claimed in claim 2 in which the locking device comprises a rotatable arm.

4. A hub as claimed in claim 1 in which the means for attaching the hub to a screen bracket comprises a cylindrical support member having a first and second end, and a flange at the first end secured within the casing and means for fixing the second end to a screen bracket.

5. A hub as claimed in claim 1 in which the spring is located in a bore at a lower end of the casing, an upper end of the bore merging with the arcuate cavity.

6. A hub as claimed in claim 5 in which the spring is located on a spigot at a lower end of the bore.

7. A wall mounting system for a screen comprising a wall mount for attachment to a wall, a screen bracket for attachment to a screen and a hub as claimed in claim 1 attached to the wall mount and the screen bracket.

* * * * *